Sept. 8, 1964 P. K. TRIMBLE 3,147,624
UNBALANCE MEASURING SYSTEMS
Filed Feb. 23, 1961 2 Sheets-Sheet 1

INVENTOR.
Philip K. Trimble
BY
Robert B. Gerhardt
ATTORNEY

INVENTOR.
Philip K. Trimble
BY
Robert B. Gerhardt
ATTORNEY

United States Patent Office

3,147,624
Patented Sept. 8, 1964

3,147,624
UNBALANCE MEASURING SYSTEMS
Philip K. Trimble, Rochester, Mich., assignor to General Motors Corporation, Detroit, Mich., a corporation of Delaware
Filed Feb. 23, 1961, Ser. No. 91,022
9 Claims. (Cl. 73—462)

This invention relates to an unbalance measuring system and more particularly to an unbalance measuring system wherein the accuracy of results is relatively uneffected by a high noise imposed on the unbalance signal.

In some systems used to determine the amount of unbalance of a rotating member and particularly those which utilize full wave rectifiers to change the sinusoidal unbalance signal to a D.C. signal, there is a minimum signal to noise ratio which will give accurate unbalance readings. An example of such a measuring system is shown in my Patent No. 3,048,041 assigned to the assignee of the present invention.

In order to overcome noise created inaccuracies especially where the part is being balanced to a very low tolerance, it has been generally necessary to simulate a large unbalance in the part by adding known check weights to the workpiece. This has the effect of raising the signal to noise ratio and more accurate measurements can then be made. By moving the weights around to several, usually four but as many as twelve, points on the workpiece, a graphical plot can be made of the actual unbalance with the added weight cancelled out. This procedure is especially necessary where an unbalance measuring apparatus is being calibrated, since a much higher accuracy of measurement is required under these conditions. This calibrated or check weight method is tedious and time consuming since it requires starting and stopping the workpiece several times, moving the weight each time and finally making the calibration plot. Also it is not always possible to find a location for a check weight in the correction plane due to the shape or geometry of the part being balanced.

It is therefor an object of this invention to provide an unbalance measuring system that provides a high signal to noise ratio measurement without adding weights to the workpiece.

A further object of the invention is to provide an unbalance measuring system wherein a simulated unbalance is added to the actual unbalance by electronic means rather than mechanically.

Still another object is to provide such a system wherein the phase relationship between the actual unbalance and a relatively large simulated unbalance can be varied at will or automatically.

These and other objects and advantages will be readily apparent from the following description and accompanying drawings in which.

Figure 1:
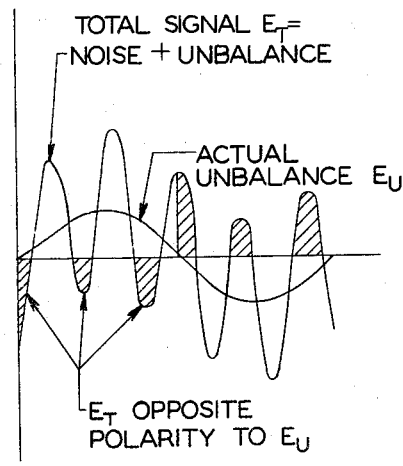
FIGURE 1 illustrates the effect of noise superimposed on an unbalance signal.
Figure 2:
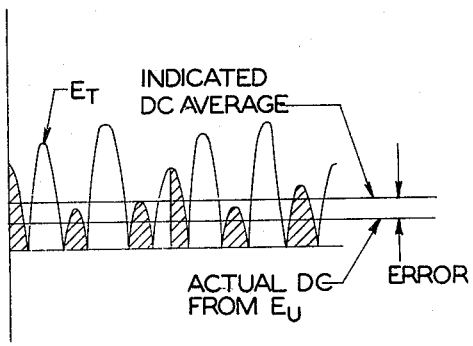
FIGURE 2 shows the error effect of noise on the FIGURE 1 signal when measured by a full wave rectifier measuring circuit.

Referring to FIGURE 1 which shows a voltage-time plot of signals, it will be seen that a large noise superimposed on an unbalance signal $E_U$ will modulate the same to a degree wherein the value of the combined signal $E_T$ is at times of opposite polarity than the actual unbalance signal. The hatched areas in FIGURE 1 indicate the time periods during which the combined signal $E_T$ is of opposite polarity from the actual unbalance $E_U$. FIGURE 2 shows the combined signal $E_T$ of FIGURE 1 after it has passed through a full wave rectifier. Filtering of the rectified $E_T$ provides an average D.C. voltage labeled "indicated D.C. average" in the figure. Due to the hatched areas this average D.C. value of the combined signal is greater than that which would be obtained from a signal having only the actual unbalance component. The D.C. that would be indicated by the actual unbalance alone without noise is shown labeled "actual D.C. from $E_U$." Wherein ordinarily, the noise tends to cancel itself out, the noise in this case does not cancel out since it influences the full wave rectifier to change polarity at a wrong time. The result is an inaccurate D.C. output and hence an inaccurate indication of the actual unbalance magnitude. The resulting indicated error is the difference between the indicated D.C. average and the actual D.C. from $E_U$.

In order to prevent or at least greatly reduce the error shown in FIGURE 2 caused by the noise, the present invention provides for adding an additional signal to the combined actual unbalance and noise signal. This added signal, referred to as a simulated unbalance signal, should have the same frequency as the actual unbalance and should be relatively large compared to the actual unbalance signal. In some arrangements, as will be seen later, the added signal need only be approximately of the same frequency as the actual unbalance. In any event, provision is made for varying the phase relationship between the simulated unbalance signal and the actual unbalance signal whereby the signals may be brought into 0 degrees or 180 degrees phase relationship and whereby either the maximum or minimum D.C. reading can be made.

Figure 3:
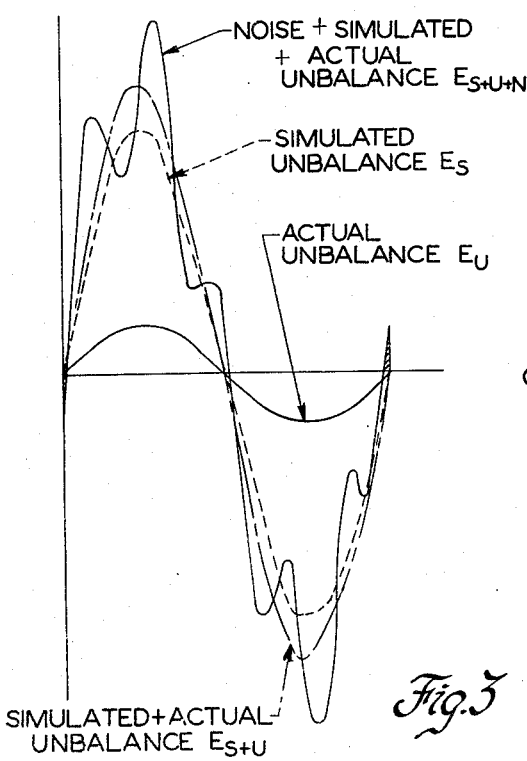
FIGURE 3 illustrates an unbalance signal having a high noise superimposed with a large simulated unbalance signal added and in phase in the unbalance signal.

FIGURE 3 shows the effect of adding a simulated, relatively large, sinusoidal signal $E_S$ to the actual signal $E_U$. As will be explained below the simulated signal need not be sinusoidal but may be of any shape. Here $E_S$ has the same frequency and phase as $E_U$. This results in a signal $E_{S+U}$ that is sufficiently large so that modulation by a noise results in a total signal or wave form $E_{S+U+N}$ that remains at the same polarity as the actual unbalance $E_U$ except for very short negligible periods indicated by the hatched areas. By increasing the value of $E_S$ even more this area becomes smaller and smaller.

Figure 4:
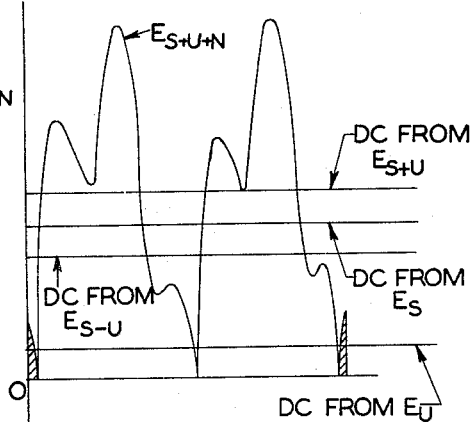
FIGURE 4 shows the signal of FIGURE 3 when measured by a full wave rectifier circuit.

When the total signal $E_{S+U+N}$ passes through a full wave rectifier the signal takes the form shown in FIGURE 4. After filtering, an average D.C. shown as "D.C. from $E_{S+U}$" is obtained which can be directly measured by a D.C. voltmeter. Since the hatched area represents only a very small portion of the total voltage, the noise effect on the indicated D.C. will be negligible. If the simulated unbalance singal $E_S$ is 180 degrees out of phase with $E_U$ instead of in phase with $E_U$, the resultant or combined signal will be $E_S - E_U$. The average D.C. value of this is shown as "D.C. from $E_{S-U}$". By taking one half of the difference between the "D.C. from $E_{S+U}$" and the "D.C. from $E_{S-U}$" the D.C. due to the actual unbalance $E_U$ can be determined. Likewise if the D.C. value from $E_S$ alone is known, this value can be subtracted from the "D.C. from $E_{S+U}$" to obtain a value for $E_U$. In this case only the in phase measurement need be made.

Figure 5:
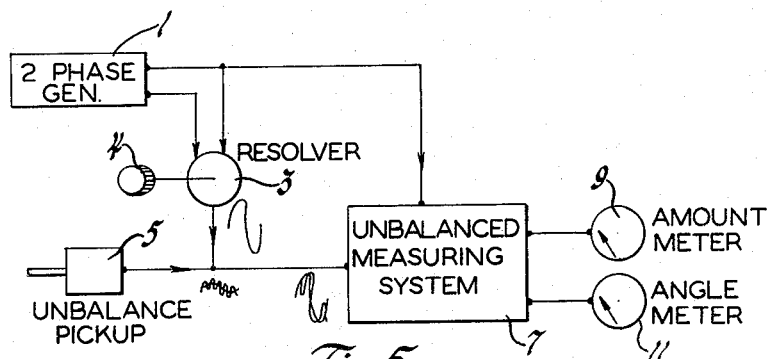
FIGURE 5 shows, in block diagram form, one arrangement employing the invention in a system employing a two phase generator providing a simulated signal.
Figure 6:
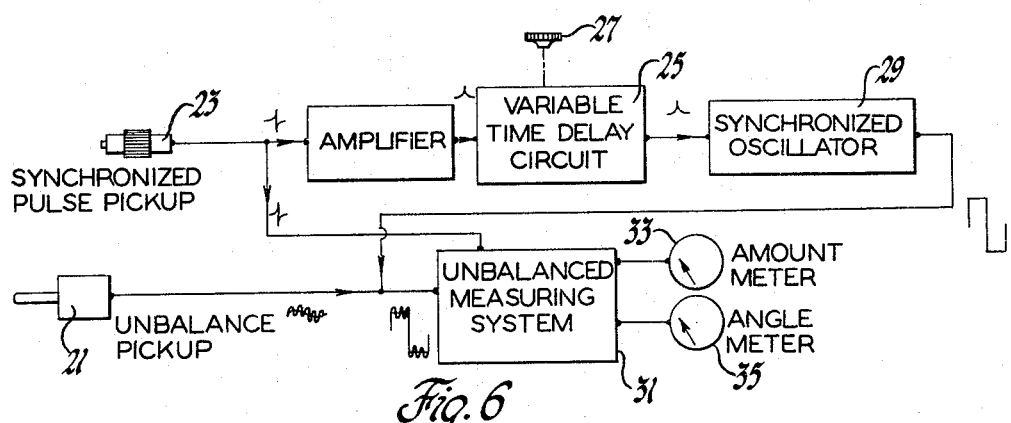
FIGURE 6 shows another arrangement in which a pulse pickup is utilized to create a simulated unbalance signal.
Figure 7:
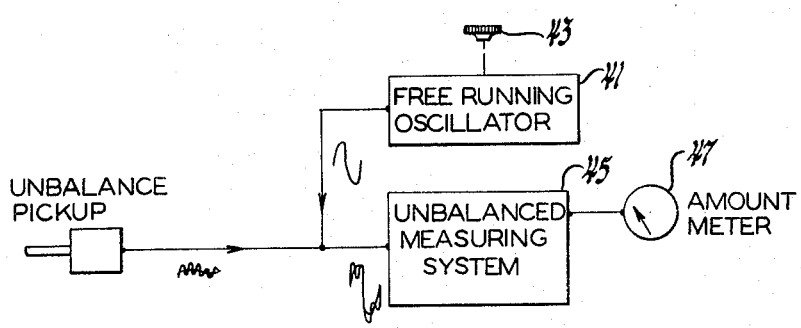
FIGURE 7 is still another arrangement which utilizes a free running oscillator for providing the simulated unbalance.

FIGURES 5, 6 and 7 show three arrangements wherein the principles of the invention are incorporated in an unbalance measuring system. Other systems than those shown are also possible. The system of FIGURE 5 includes a two phase generator or alternator 1 that is geared or coupled to the rotating workpiece and which provides a pair of sine wave outputs 90 degrees apart and the phase of which bears a definite relationship to the actual unbalance in the workpiece. This type of generator is often used as a reference signal source and is used in combination with a phase control as a resolver through which the phase of a single output can be varied at will. FIGURE 5, shows a sine-cosine resolver 3 having a hand control 4 and which may be of the type described in Patent No. 2,988,918 assigned to the assignee of the present invention, except that the inputs and outputs are reversed, i.e., in this present embodiment each input has one of the different phase outputs from the generator applied thereto and there is a single output. This use of the resolver 3 is well known and is explained on page 160 of Electronic Instruments by Greenwood, Holdam and MacRae, a McGraw-Hill publication.

An unbalance pickup 5 provides a signal including actual unbalance and noise components. The pickup 5 is connected to any suitable manner to the workpiece being tested. The output from the resolver 3 is combined with the signal from the pickup 5 and fed to an unbalance measuring system generally indicated at 7. This measuring system may be of the full wave rectifier type such as that shown in my Patent No. 3,048,041, supra. The system 7 has a pair of meters 9 and 11 which give amount and angle readings respectively. The angle meter 11 indicates the phase angle between the reference signal from the generator 1 and the unbalance signal while the amount meter 9 indicates the average D.C. value of the unbalance signal.

As mentioned above, the actual unbalance amount can be determined in several ways. One method is to turn the control 4 of the resolver 3 until the amount meter 9 indicates a maximum corresponding to the value D.C. from $E_{E+U}$ in FIGURE 4. The indicated amount is then recorded as value A. The control 4 is then moved until the amount meter 9 indicates a minimum corresponding to the value D.C. from $E_{S-U}$ in FIGURE 4. This value is then recorded as value B. The actual unbalance C can then be found from $$C = \frac{A-B}{2}$$

Another method for determining the actual unbalance would be to record a reading D on meter 9 with the pickup 5 disconnected from the workpiece. This reading would be that obtained from the D.C. value of $E_S$ alone. The pickup would then be connected to the workpiece and the control 4 varied until the meter 9 indicated a maximum reading A. The amount of actual unbalance C would then be $C = A - D$.

FIGURE 6 illustrates another arrangement employing the invention. In this case an unbalance pickup 21 again provides sinusoidal signal having noise thereon. Instead of the generator 1 of FIGURE 5, a synchronized pulse pickup 23 is positioned adjacent the rotating workpiece to provide a one per revolution pulse. The pickup 23 may be of any suitable form such as a magnetic or photo electric pickup. This type of pickup is used on some unbalance measuring systems such as that shown in Patent No. 3,048,041, for providing a reference signal whose phase can be compared with that of an unbalance signal in order to determine the location of the unbalance in the workpiece. The pulse from the pickup as used in the FIGURE 6 arrangement, is amplified and fed into a variable time delay circuit 25. The time delay circuit 25 may be of any suitable form such as a one shot multi-vibrator, which provides an output pulse which is delayed from the input pulse by an amount varied by a control 27. This variable phase pulse is connected to a synchronized oscillator 29 which may be a saw tooth generator, a multi-vibrator or any other pulse synchronized type oscillator circuit which will produce an output wave form consisting primarily of the fundamental or unbalance frequency. The output of the oscillator 29 of FIGURE 6 is shown as a square wave although other types of oscillators mentioned would produce other type of waves. This simulated signal is added to the actual unbalance signal and fed into an unbalance measuring system 31 which may be the same as the measuring system 7 of FIGURE 5. An amount meter 33 and angle meter 35 indicate respectively the D.C. value of the input signal to the system 31 and the phase angle between that signal and the reference pulse from the pickup 23. This synchronized pulse pickup system is shown and explained in my Patent No. 3,048,051, supra.

The operation of the apparatus in FIGURE 6 is the same as that of FIGURE 5. The actual unbalance can be determined by manipulation of the variable time delay control 27 to phase the square wave with the unbalance signal to obtain maximum readings on the amount meter 33 and/or phase the square wave with the unbalance signal to produce a minimum indication on the amount meter 33. The information obtained from the meter 33 can then be used to determine the actual unbalance in the same manner as the information obtained from amount meter of the system of FIGURE 5.

The arrangement shown in FIGURE 7 differs from that of FIGURES 5 and 6 in that no reference pulse or signal is required to provide the simulated unbalance signal. In this case an unsynchronized oscillator 41, such as a free running multi-vibrator, is utilized to produce the simulated unbalance signal. By means of a manual frequency adjustment 43, the operator can control the rate at which the simulated signal produced thereby drifts through or changes phase with the actual unbalance signal. If the frequency adjustment is made so that the output of the oscillator 41 has a frequency within two-tenths of a cycle per second of the unbalance frequency, it will require five seconds for the output from the oscillator 41 to change 360 degrees with respect to the actual unbalance signal.

This last method of introducing a simulated unbalanced signal has the advantage of automatic phase shifting as well as remaining absolutely constant in amplitude while being shifted in phase. The oscillator 41 of FIGURE 7 may, as in the pulse synchronized oscillator 29 of FIGURE 6, have any wave shape output (sinusoidal saw tooth, rectangular, etc.) consisting primarily of the fundamental or unbalance frequency within the 0.2 c.p.s. range of the unbalance signal frequency. The output from the oscillator 41 is added to the unbalance signal from the pickup and fed into an unbalance measuring system 45 similar to that of FIGURES 5 and 6. The average D.C. value of the signal being fed into the unbalance measuring system 45 will be indicated on an amount meter 47.

To operate the arrangement of FIGURE 7, the frequency control 43 is moved until the time of the swing of the needle on the amount meter 47 from its maximum to minimum position is long enough, such as five seconds or more, so that the operator can read and record the value of reading at such maximum and minimum positions. These maximum and minimum values can then be used to determined the actual unbalance amount in the manner indicated for the FIGURE 5 and FIGURE 6 arrangement.

Other system than those shown in FIGURES 5, 6 and 7 could be utilized for electronically simulating an unbalance signal and mixing the same with an actual unbalance signal to give the same results as adding a known weight at various angles to the workpiece. It will be seen that I have provided a relatively simple method and apparatus whereby the accuracy of existing unbalance measuring system can be improved by eliminating the effect of noise in the system, and yet, which does not require mechanically adding weights to the workpiece and making a series of runs with the weights attached at various points on the workpiece. Other arrangements, applications and changes in the illustrated examples may be made without departing from the invention which is limited only by the following claims:

What is claimed is:

1. An unbalance measuring system including vibration pickup means having an output unbalance signal including both an unbalance component proportional to the amplitude of vibration of a rotating workpiece whose unbalance is being measured and modulating noise components, means producing a simulated unbalance signal having approximately the frequency of the unbalance signal component, means for changing the phase relationship between the actual and the simulated unbalance signals, means for combining the signals, the simulated unbalance signal being of such an amplitude that during modulation of the combined signal by the noise components the combined signal remains at substantially the same polarity during each half cycle, and measuring means responsive to the combined signal and operative to rectify the combined signal so as to permit amplitude measurements both where the actual and the simulated signals are in phase and 180° out of phase thereby enabling the amplitude of said unbalance component to be isolated and accordingly the actual unbalance to be determined relatively uninfluenced by the noise components.

2. An unbalance measuring system including a vibration pickup providing an unbalance signal including both an unbalance component proportional to the amplitude of vibration of a rotating workpiece whose unbalance is being measured and modulating noise components, means responsive to the rotation of the workpiece producing a simulated unbalance signal having approximately the frequency of the unbalance signal component, means for changing the phase relationship between the actual and the simulated unbalance signals, means for combining said signals, the simulated unbalance signal being of such an amplitude that during modulation of said combined signal by the noise components the combined signal remains at substantially the same polarity during each half cycle, and measuring means responsive to the combined signal and operative to rectify the combined signal so as to develop output signals corresponding to the relative amplitude of the rectified combined signal both when the phase relationships between the actual and the simulated signals are 0° and 180° thereby enabling the amplitude of the unbalance component to be mathematically determined from the output signals relatively uninfluenced by the noise components.

3. An unbalance measuring system including a vibration pickup providing an unbalance signal including an unbalance component proportional to the amplitude of vibration of a rotating workpiece whose unbalance is being measured and modulating noise components, means associated with the workpiece producing a pulse once each revolution of the workpiece, adjustable time delay means for changing the phase of the pulse with respect to the unbalance signal, a variable frequency oscillator providing an output signal whose phase and frequency is controlled by the time delayed pulse, means combining the unbalance and the output signals, the output signal being of such an amplitude that during modulation of the combined signal by the noise components the combined signal remains at substantially the same polarity each half cycle, and amplitude measuring means connected to the combining means and operative to full wave rectify the combined signal, the measuring means including a meter connected to the rectified combined signals for indicating on the meter the average D.C. value of the combined signals when the time delay means establishes a certain phase relationship between the unbalance signal and the output signal so as to permit the average D.C. value of the unbalance component to be accurately determined uninfluenced by the noise components.

4. An unbalance measuring system including a vibration pickup providing an unbalance signal including an unbalance component proportional to the amplitude of vibration of a rotating workpiece whose unbalance is being measured and modulating noise components, frequency controlled oscillator means producing a simulated unbalance signal, means for adjusting the frequency of said oscillator signal to a value within 0.2 cycle per second of said unbalance signal frequency, means for combining said signals, the simulated unbalance signal being of such an amplitude that during modulation of said combined signal by the noise components the combined signal remains at substantially the same polarity during each half cycle, measuring means responsive to the combined signal and operative to rectify the combined signal for indicating changes in the relative amplitude of the combined signal as the unbalance signal and simulated signal drift into and out of phase so as to permit the unbalance component to be accurately ascertained uninfluenced by the noise components.

5. An unbalance measuring system including vibration pickup means having an output unbalance signal including an unbalance component proportional to the amplitude of vibration of a rotating workpiece whose unbalance is being measured and modulating noise components, means associated with said workpiece producing a reference signal having the same frequency as the unbalance signal and a phase relationship to said unbalance signal dependent on the location of the unbalance in the workpiece with respect to a fixed point on the workpiece, means providing a simulated unbalance signal having the same frequency as the reference signal and a variable phase relationship thereto, means for combining said unbalance and simulated unbalance signals, the simulated unbalance signal being of such an amplitude that during modulation of said combined signal by the noise components the combined signal remains at substantially the same polarity during each half cycle, measuring means responsive to the combined signal for developing the average D.C. value of the combined signal so that the average D.C. value of unbalance component can be accurately ascertained uninfluenced by the noise components, and means for measuring the phase angle between the combined signal and reference signal when said unbalance signal and said simulated unbalance signal are in phase so as to determine the angular location of the unbalance.

6. An unbalance measuring system including vibration pickup means having an output actual unbalance signal including both an unbalance component proportional to the amplitude of vibration of a rotating workpiece whose unbalance is being measured and modulating noise components, means producing a simulated unbalance signal having substantially the same frequency as the unbalance signal, means for changing the phase relationship between the actual and the simulated unbalance signals, means for combining the signals, the simulated unbalance signal being of such an amplitude that during modulation of said combined signal by the noise components the combined signal remains at substantially the same polarity during each half cycle, means connected to the means for combining the signals and responsive to the combined signal for providing rectification and filtering of the combined signal so as to develop a D.C. output signal proportional to the average D.C. value of the combined signal, the latter means cooperating with the means for changing the phase relationship so as to develop a D.C. output signal of a maximum value when the actual and simulated signals are in phase and a D.C. output signal of a minimum value when the signals are 180° out of phase thereby enabling the value of the unbalance component to be mathematically and accurately determined from the maximum and minimum values relatively uninfluenced by the noise components.

7. An unbalance measuring system including vibration pickup means providing a sinusoidal unbalance signal including both an unbalance component proportional to the amplitude of vibration of a workpiece whose unbalance is being measured and modulating noise components, means producing a simulated unbalance signal having substantially the same frequency as the unbalance signal and of a known amplitude, phase adjusting means for causing the actual and the simulated unbalance signals to be in phase, means for combining said signals, the simulated unbalance signal being of such an amplitude that during modulation of said combined signal by the noise components the combined signal remains at substantially the same polarity during each half cycle, and measuring means responsive to the combined signal and operative to full wave rectify the combined signal so that the amplitude of the rectified combined signal and the known amplitude of the simulated signal can be compared and thereby enable the amplitude of the unbalance component and accordingly the unbalance to be accurately ascertained without influence from noise.

8. A method of obtaining accurate measurement of unbalance in rotatable members including the steps of forming a first signal having an unbalance component of an amplitude that varies with the amount of unbalance and modulating noise components, forming an alternating second signal of an amplitude and of a frequency approximating the frequency of the first signal that when combined with the first signal will cause the combined signal during modulation by the noise components to remain substantially at the same polarity throughout each half cycle, combining the first and second signals, rectifying the combined signal, measuring the average D.C. value of the rectified combined signal, varying the phase relationship between the first and second signals to obtain a maximum D.C. amplitude reading, and varying the phase relationship between the first and second signals to obtain a minimum D.C. amplitude reading, whereby one-half of the difference between the maximum and minimum reading will provide a value equivalent to a reading that would be obtained by a maximum amplitude reading of the unbalance component alone, thereby substantially eliminating the influence of the noise components on the amplitude of the unbalance component.

9. A method of obtaining accurate measurement of unbalance in rotatable members including the steps of forming a first signal having an unbalance component of an amplitude that varies with the amount of unbalance and modulating noise components, forming an alternating second signal of an amplitude and of a frequency approximating the frequency of the first signal that when combined with the first signal will cause the combined signal during modulation by the noise components to remain substantially at the same polarity throughout each half cycle, rectifying the second signal and measuring the average D.C. value of the same, combining the first and second signals, rectifying the combined signals and measuring the average D.C. value of the same, varying the phase relationship between the first and second signals while measuring the average D.C. value of the combined signal to obtain a maximum amplitude reading, and subtracting the average D.C. reading known to be due to the second signal from the maximum amplitude reading of the combined signals to obtain an average D.C. value due to the unbalance component thereby substantially eliminating the influence of the noise components on the amplitude of the unbalnace component.

References Cited in the file of this patent

UNITED STATES PATENTS

| | | |
|---|---|---|
| 2,118,770 | Silversten | May 24, 1938 |
| 2,243,379 | Johnson | May 27, 1941 |
| 2,783,648 | Stovall et al. | Mar. 5, 1957 |
| 2,816,445 | Rambo | Dec. 17, 1957 |
| 2,882,745 | Comstock | Apr. 21, 1959 |
| 2,947,173 | Lash | Aug. 2, 1960 |
| 2,975,640 | Quell | Mar. 21, 1961 |
| 2,988,918 | King | June 20, 1961 |
| 3,034,330 | Jaworowicz | May 15, 1962 |
| 3,077,781 | Silver | Feb. 19, 1963 |

FOREIGN PATENTS

| | | |
|---|---|---|
| 803,307 | Great Britain | Oct. 22, 1958 |

UNITED STATES PATENT OFFICE
CERTIFICATE OF CORRECTION

Patent No. 3,147,624                                  September 8, 1964

Philip K. Trimble

It is hereby certified that error appears in the above numbered patent requiring correction and that the said Letters Patent should read as corrected below.

Column 1, line 41, for "therefor" read -- therefore --; column 2, line 60, for "singal" read -- signal --; column 3, line 22, for "to", first occurrence, read -- in --; line 38, for "$E_{E+U}$" read -- $E_{S+U}$ --; column 4, line 14, for "Patent No. 3,048,051" read -- Patent No. 3,048,041 --; line 65, for "system" read -- systems --; column 5, line 22, for "where" read -- when --.

Signed and sealed this 5th day of January 1965.

(SEAL)
Attest:

ERNEST W. SWIDER                                EDWARD J. BRENNER
Attesting Officer                                       Commissioner of Patents